United States Patent [19]
Cairelli

[11] 3,732,476
[45] May 8, 1973

[54] LOW COST SWITCHING ARRANGEMENT FOR APPLIANCE MOTOR SPEED CONTROL

[75] Inventor: Carmen P. Cairelli, Farmington, Conn.

[73] Assignee: McGill Manufacturing Company, Inc., Valparaiso, Ind.

[22] Filed: May 21, 1971

[21] Appl. No.: 145,925

Related U.S. Application Data

[63] Continuation-in-part of Ser. No. 858,431, Sept. 16, 1969, abandoned.

[52] U.S. Cl. ................................. 318/305, 200/5 E
[51] Int. Cl. ............................................. H01h 9/26
[58] Field of Search ..................... 318/305, 351; 200/5 E, 5 EA

[56] References Cited

UNITED STATES PATENTS

| | | | |
|---|---|---|---|
| 3,519,766 | 7/1970 | Mackway | 200/5 EA |
| 3,286,150 | 11/1966 | Wilson et al. | 318/351 X |
| 3,399,282 | 8/1968 | Nagashima | 200/5 E |
| 3,420,969 | 1/1969 | Edwards et al. | 200/5 EA |
| 3,470,332 | 9/1969 | Milner et al. | 200/5 EA |
| 3,476,890 | 11/1969 | Powell | 200/5 EA |

Primary Examiner—J. D. Miller
Assistant Examiner—Robert J. Hickey
Attorney—Mueller and Aichele

[57] ABSTRACT

A switching arrangement for a motor control system for a small appliance such as a blender is provided which includes a housing and a plurality of longitudinally movable, push button-operated switch actuators located therein. Each actuator carries a switch contact which, together with a corresponding set of contacts associated with the housing, forms a control switch. The actuators are adapted to cooperate with a plurality of laterally displaceable blocks to provide positive lock-out of the other actuators when one actuator is depressed unless a further actuator is positively actuated. The control switches operated by the actuators control the energization of the stator windings associated with the motor and a contact located on one of the blocks together with a housing-mounted contact forms a range switch for controlling the connection of a diode into the motor control circuit. The provision of two taps on one stator winding enables a system of eight actuator-operated control switches and the range switch to provide seven motor speeds as well as disconnection of the motor.

11 Claims, 5 Drawing Figures

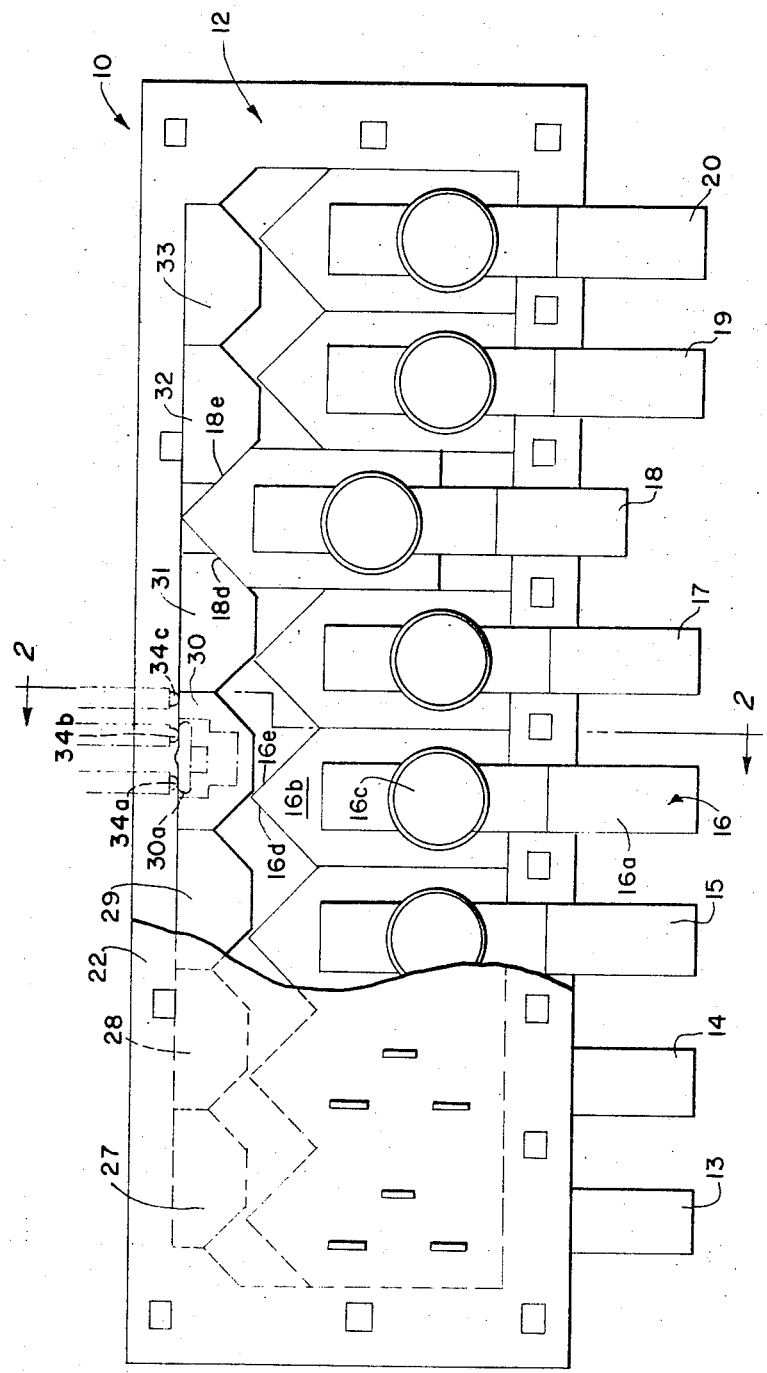

INVENTORS
CARMEN P. CAIRELLI

BY *Larson and Taylor*
ATTORNEYS 3,732,476

LOW COST SWITCHING ARRANGEMENT FOR APPLIANCE MOTOR SPEED CONTROL

CROSS REFERENCE TO RELATED APPLICATIONS

This application is a continuation of application Ser. No. 858,431, filed Sept. 16, 1969, now abandoned.

FIELD OF THE INVENTION

The present invention relates to switching arrangements and more particularly to push button-actuated switching arrangements used in motor control circuits for home appliances and the like.

BACKGROUND OF THE INVENTION

A number of problems must be overcome in producing satisfactory switching arrangements for use in the motor control circuits of home appliances such as blenders or the like. In general, such switching arrangements must be reliable and effective yet must be relatively inexpensive. Further, the construction of the mechanical switching system as well as the electrical circuitry used therewith should be relatively simple because of manufacturing and maintenance considerations. These problems are made even more difficult where multi-speed appliances are involved in that both the electrical and mechanical controls therefor must be correspondingly more complex.

A conventional form of switching arrangement in accordance with the prior art includes a multi-wound motor and a series of diodes which are selectively switched in and out of the control circuit. Motors used with this arrangement are expensive in that four separate coils are used in the motor stator. In general, because of the number of stator coils used and because of the number of switching functions which must be performed, the switching arrangements of this type are both complicated and expensive.

SUMMARY OF THE INVENTION

In accordance with the invention an extremely economical switching arrangement is provided which is relatively simple in construction both electrically and mechanically.

Considering some of the advantages of the present invention, as incorporated in a specific motor control switching a witching arrangement according to the invention includes a motor control system wherein two simple taps on a stator coil are used in providing a seven speed control for the motor. In accordance with further features of the invention, the "make" contacts of the switching arrangement are all connected together and the switches utilized are all single-throw switches and thereby provide the contact economy attendant such switches. The mechanical construction of switching arrangement is rugged, compact and reliable and provides both effective lock-out of non-actuated switches and effective detenting of an actuated switch so that the operation of the arrangement is not effected by mechanical shocks and vibrations. In addition, the mechanical construction of the switch arrangement eliminates the need for return springs, latches, locking devices and the like normally associated with such arrangements.

In accordance with a presently preferred embodiment of the invention, a switching arrangement for a motor control system for a small appliance or the like is provided which includes a housing and a plurality of longitudinally movable, push button-operated switch actuators located therein. Each actuator carries a switch contact which together with corresponding contact or set of contacts associated with the housing forms a control switch. The actuators are adapted to cooperate a plurality of laterally displaceable blocks to provide positive lock-out of the other actuators when one actuator is actuated unless a further actuator is positively actuated, as well as to provide detenting of the actuated actuator. Cooperating beveled surfaces on the actuators and blocks provide a wedging action that causes de-actuation of a previously actuated actuator when a further actuator is depressed. The control switches operated by the actuators control the energization of the stator windings associated with the motor. A contact located on one of the blocks forms a range switch with a housing-mounted contact or set of contacts for controlling the connection of a diode into the motor control circuit. The provision of two taps on one stator winding enables a system of eight actuator-controlled control switches and the range switch to provide seven motor speeds as well as disconnection of the motor, in response to the depression of the various actuators.

In one embodiment of the invention all of the actuators are arranged on the same level in the housing whereas in a second embodiment the actuators are arranged on two levels within the housing.

Other features and advantages of the invention will be set forth in or apparent from the detailed description of presently preferred embodiments thereof found hereinbelow.

BRIEF DESCRIPTION OF THE DRAWINGS

FIG. 1 is a plan view, partially broken away, of a first embodiment of the invention;

DESCRIPTION OF THE PREFERRED EMBODIMENTS and movable

Figure 2:
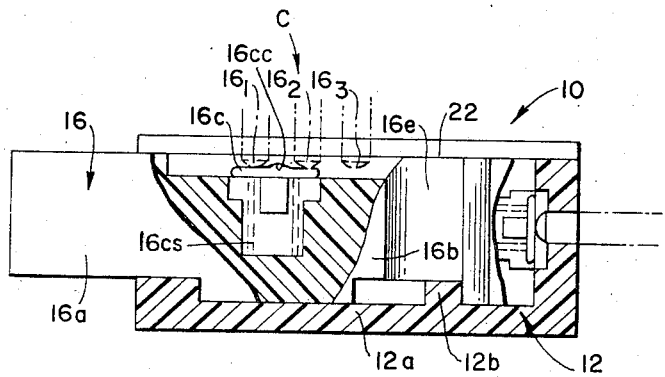
FIG. 2 is a section view, partially broken away, taken generally along line 2—2 of FIG. 1.

Referring to FIGS. 1 and 2, a switching device 10 in accordance with one embodiment of the present invention includes a housing 12 open at the top side only and a plurality of push button actuators 13, 14, 15, 16, 17, 18, 19 and 20. Considering push button actuator 16 as exemplary and referring to FIG. 2 in particular, actuator 16 includes a push button portion 16a which extends outwardly of housing 12 through an opening in an end wall thereof, an insulating body or carrier portion 16b formed integrally with push button 16a and movable therewith, and a conductive contact 16c mounted in and carried by body portion 16b. The end of body portion 16b is generally V-shaped as viewed in plan, beveled surfaces 16d and 16e coacting with similarly beveled surfaces on control blocks described hereinbelow. As is shown in FIG. 2, body portion 16b includes a downwardly extending flat-bottomed base portion which is adapted to slide on a floor portion 12a of housing 12.

A circuit board 22 is secured to housing 12 by suitable conventional means and includes a series of sets of three contacts generally denoted C. Contacts C are located on the interior surface of circuit board 22 and each set is positioned adjacent an associated push button switch contact corresponding to contact 16c described hereinabove. The identifying numbers for the contacts of each set include the number used in identifying the adjacent push-button actuator and, thus, referring to FIG. 2, the set of contacts adjacent push button actuator 16 are denoted $16_1$, $16_2$ and $16_3$. With push button actuator 16 in the undepressed position thereof, actuator switch contact 16c provides a conductive path between contacts $16_1$ and $16_2$ and thus completes any circuit connected between these contacts. With actuator 16 depressed (see actuator 18 of FIG. 1) a conductive path is completed between contacts $16_2$ and $16_3$.

A series of slidable control blocks 27, 28, 29, 30, 31, 32 and 33 are positioned along the wall of housing 12 opposite actuators 13 to 20. Blocks 27 to 33 are capable of being displaced laterally but are precluded from longitudinal movement by a stop member 12b which projects upwardly from floor 12a of the housing 12 (see FIG. 2). Stop member 12b also serves in limiting the travel of switch actuator members 13 to 20. As mentioned hereinabove blocks 27 to 30 include beveled surfaces which coact with the end surfaces of corresponding actuators. For example, with push button actuator 18 depressed as shown the end surfaces 18d and 18e thereof engage corresponding beveled surfaces of blocks 31 and 32, respectively, and act to wedge blocks 31 and 32 apart. It is noted that the walls of housing 10 adjacent block members 27 and 32 include outwardly extending portions which also beveled to produce the wedging action described hereinabove. The spacing between blocks 27 to 33 is such that only one push-button actuator can be depressed at a time, the arrangement thus providing positive lock-out. Further, the wedging action described hereinabove provides detenting so that the actuators are held securely in place. Depression of a further actuator will cause the previously actuated actuator to be returned to the initial position thereof through the wedging action of the corresponding blocks. Thus, the arrangement provides positive return of previously actuated actuators without the necessity for return springs and the like conventionally associated with such arrangements.

As mentioned hereinabove, in accordance with a further feature of the invention, positive detenting of the actuators 13 to 20 is provided. As can be best seen in FIG. 2, contact 16c includes an upwardly extending projection or protuberance 16cc which engages between the contacts of contact set C. A coil spring 16cs biasses contact 16c outwardly (upwardly in FIG. 2) so that good electrical contact is maintained. In the normal, unactuated position of actuator 16 shown in FIG. 2, contact projection 16cc engages between contacts $16_1$ and $16_2$. When actuator 16 is actuated by depressing push-button on 16a, projection 16cc rides over terminal $16_2$ and snaps into position between terminals $16_2$ and $16_3$, contact 16c being detented in this position through the cooperative action of projection 16cc and spring 16cs.

It will be appreciated that, for example, with actuator 18 depressed, all of the blocks to the left thereof as viewed in FIG. 1, namely blocks 27, 28, 29, 30 and 31, will be displaced to left and all of the blocks to right thereof, namely blocks 32 and 33, will be displaced to the right. Block 30 is provided with a switch contact 30a mounted in the rear surface thereof which cooperates with a set of three stationary switch contacts 34a, 34b and 34c mounted in the rear wall of housing and extending therethrough to positions adjacent contact 30a. With block 30 in a first portion, that is, the "left" position thereof shown in FIG. 1, a conductive path will be provided between switch contacts 34a and 34b whereas with block 30 in the second or "right" position thereof and a conductive path will be provided between contacts 34a and 34b. As is indicated in broken lines in FIG. 1 regarding blocks 30, as well as in FIG. 2, blocks 27 to 31 are provided with detenting arrangements similar to those described hereinabove. As is discussed in more detail hereinbelow contacts 34a, 34b and 34c constitute a range switch with contact 30a.

Figure 3:
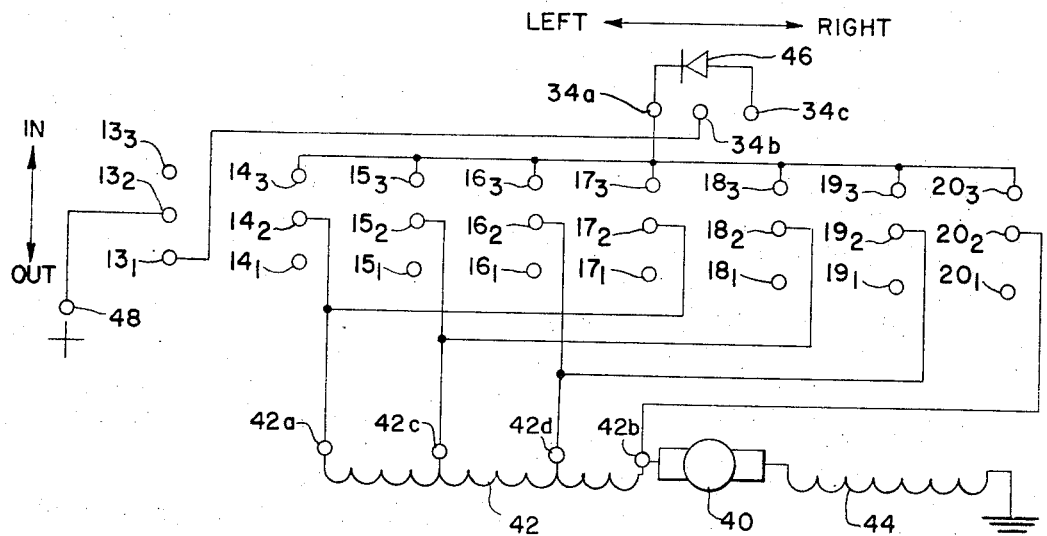
FIG. 3 is a schematic circuit diagram of the motor control system of the present invention.

As discussed hereinabove the switching arrangement described is part of a motor control system for a home appliance or the like, which is shown schematically at FIG. 3, the switch contacts shown in FIG. 3 corresponding to those described hereinabove. Thus with push-button actuator 18 depressed, contact $18_2$ is connected to in-circuit contact $18_3$ whereas with actuator 18 in the normal, undepressed position thereof contact $18_2$ is connected to "open" contact $18_1$. The motor control system of FIG. 3 includes a motor 40 including stator coils 42 and 44. One end 42a of coil 42 is connected to contact $14_2$ and to contact $17_2$ whereas the other end 42b is connected to contact $20_2$. A first tap 42c along coil 42 is connected to contact $15_2$ and to contact $18_2$ whereas a second tap 42d is connected to contact $16_2$ and to contact $19_2$. Contact $13_2$ is connected to a supply source which for a home appliance is a standard A.C. inlet 48. Contact $13_1$ is connected to contact 34b which is positioned adjacent switch contact 30a as discussed hereinabove. A diode 46 is connected between contacts 34a and 3c, contact 34a also being connected TO in-circuit terminals $14_3$, $15_3$, $16_3$, $17_3$, $18_3$, $19_3$ and $20_3$.

The arrangement described provides seven different speeds for motor 40. To explain, considering FIGS. 1 and 3 together with push-button actuator 14 depressed a conducting path will be provided between contacts $14_2$ and $14_3$ by actuator switch contact 14c and, because block 30 will be moved to the right, a conductive path will be provided between contacts 34b and 34c. Under these circumstances a ciruit will be completed through diode 46 and through end 42a of coil 42 to the grounded end of coil 44. Similarly, with (1) actuator 15 and (2) actuator 16 depressed, circuits will be completed through (1) diode 46 and through tap 42c and (2) diode 46 and tap 42d, respectively. On the other hand, depression of any of switch actuators 17, 18, 19 and 20, will cause block 30 to be displaced to the right and consequently, the disconnection of diode 46, a conductive path being provided between contacts 34b and 34a. Further, the depression of (1) actuator 17, (2) actuator 18, and (3) actuator 19 causes the completion of a circuit including coil 44 and (1) all of coil 42, (2) two-thirds of coil 42 and (3) one-third of coil 42. Similarly, with push-button 20 depressed, coil 42 is completely disconnected from the circuit. Push-button 13 is the "stop" button and causes disconnection of motor 40 from the power source, i.e., inlet 48. Thus, as stated hereinabove, switch actuators 14 to 20 provide seven different motor speeds, with depression of switch actuator 13 serving to stop motor 40.

Figure 4:
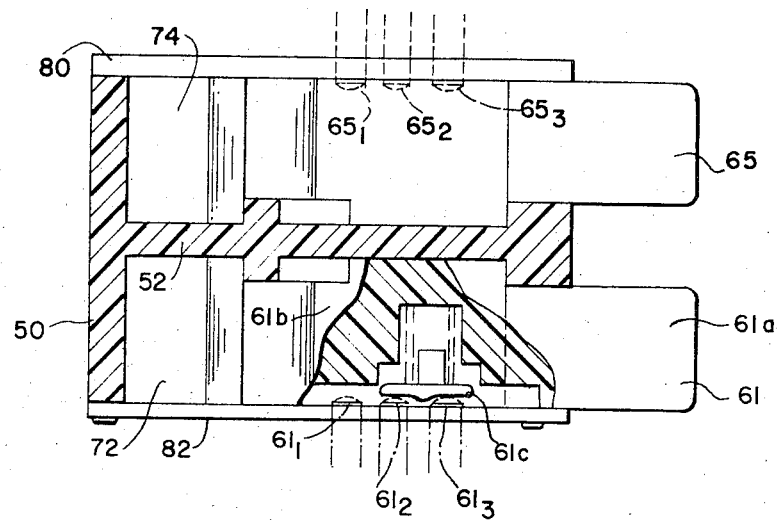
FIG. 4 is a sectional view, partially broken away, taken generally along line 4—4 of FIG. 5 showing a second embodiment of the invention.
Figure 5:
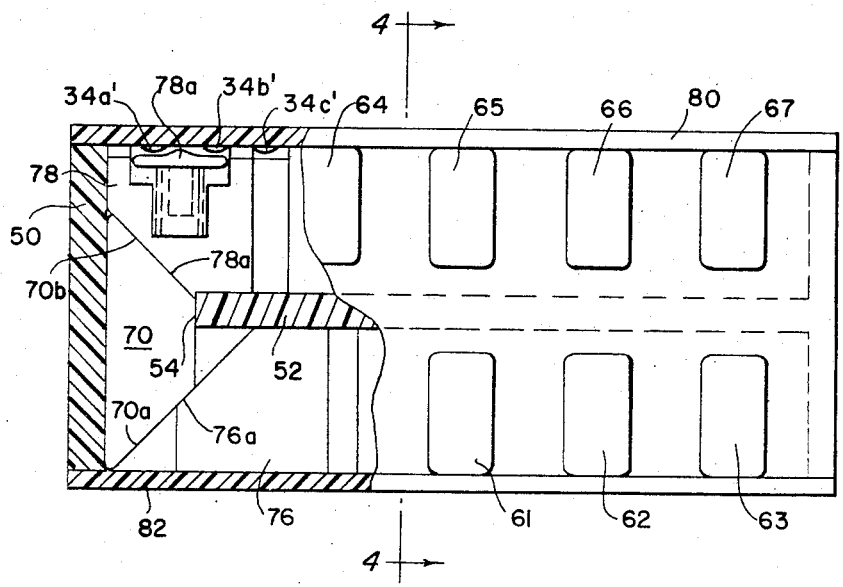
FIG. 5 is a front view, partially broken away, of the second embodiment of the invention.

Referring to FIGS. 4 and 5, an alternate embodiment of the invention is shown wherein the switch actuators are arranged on two levels. The embodiment of FIGS. 4 and 5 is quite similar to that of FIGS. 1 and 2 and thus will be described in only enough detail to permit an understanding of the differences between the two embodiments. in FIGS. 4 and 5, a housing 50 includes a first level of four push-button switch actuators, three of which denoted 61, 62 and 63 are shown, and a second level of four actuators denoted 64, 65, 66 and 67. The second level is supported on an intermediate floor section 52 which includes an opening 54 therein for receiving a vertically movable sliding block 70. Each level of housing 50 includes a plurality of laterally movable blocks (two of which denoted 72 and 74 are shown in FIG. 4). These blocks are of the form described hereinabove except for end blocks 76 and 78, positioned adjacent block 70 (see FIG. 5), which also include laterally sloping cam surfaces 76a and 78a, respectively. Block 70 includes upper and lower cam surfaces 70a and 70b which are adapted to respectively coact with cam surfaces 76a and 78a of blocks 76 and 78, respectively. Thus movement of block 70 between a first, uppermost position and a second, lowermost position (shown in FIG. 5), is controlled by the depression of the push button actuators as described hereinabove, the depression of the four actuators, including actuators 61, 62, 63, of the first level causing displacement of block 70 to the first, uppermost position and the depression of actuators 64, 65, 66 and 67 of the second or upper level causing displacement of block 70 to the second, lowermost position. Block 78 carries a contact 78a which cooperates with contacts 34a' 34b: and 34c' which control the connection and disconnection of a diode corresponding to diode 46 as discussed hereinabove. These latter contacts mounted a circuit board 80 affixed to housing 50 and forming the upper wall thereof. Circuit board 80 also includes switch contacts (contacts $65_1$, $65_2$, and $65_3$ being indicated in FIG. 4) which cooperate with switch contacts carried by actuators 64 to 67 to control energization and the operating speed of a motor corresponding to motor 40 of FIG. 3. A lower circuit board 82 includes a similar series of contacts. FIG. 4 showing contacts $61_1$, $61_2$ and $61_3$ mounted on board 82 and cooperating with associated actuator-carried contact 61c.

Although the invention has been described in detail with respect to an exemplary embodiment thereof, it will be understood by those of ordinary skill in the art that variations and modifications may be effected within the scope and spirit of the invention.

I claim:

1. In a motor control system for small appliances or the like, a switching arrangement comprising: a housing; a plurality of longitudinally displaceable switch actuators moveable between a first unactuated position and a second actuated position, each of said actuators carrying a switch contact and including a pushbutton portion extending outwardly of said housing; means for providing a wedging action for preventing the remainder of said plurality of actuators from being actuated when one of said actuators is actuated in the absence of another of said actuators being positively actuated and for returning a previously actuated actuator to the unactuated position thereof upon actuation of a further actuator, said means including a plurality of laterally displaceable block members located within said housing, each of said actuators, when actuated, entering between one of said block members and a further surface or between two of said block members and the total spacing between said block members being such that only one said actuator can be actuated at a time; and a plurality of sets of contacts assocaited with said housing for individually cooperating with a corresponding contact carried by said actuators to form a plurality of control switches, said actuators each including detenting means for positively retaining the corresponding actuator in the actuated position thereof when that actuator is actuated and for positively retaining that actuator in the unactuated position thereof when that actuator is unactuated such that when an actuator is actuated that actuator will be retained in the actuated state thereof and the remaining actuators will be retained in the unactuated states thereof, said switching arrangement further comprising at least one contact carried by at least one of said block members, at least one further contact associated with said housing for cooperating with said block member-carried contact to form a further switch, said contact carrying block member being movable between first and second positions and including detenting means for positively retaining said block member in said first position and in said second position.

2. In a motor control system for small appliances or the like, a switching arrangement comprising: a housing; a plurality of longitudinally displaceable switch actuators moveable between a first unactuated position and a second actuated position, each of said actuators carrying a switch contact and including a pushbutton portion extending outwardly of said housing; means for providing a wedging action for preventing the remainder of said plurality of actuators from being actuated when one of said actuators is actuated in the absence of another of said actuators being positively actuated and for returning a previously actuated actuator to the unactuated position thereof upon actuation of a further actuator, said means including a plurality of laterally displaceable block members located within said housing, each of said actuators, when actuated, entering between one of said block members and a further surface or between two of said block members and the total spacing between said block members being such that only one said actuator can be actuated at a time; and a plurality of sets of contacts associated with said housing for individually cooperating with a corresponding contact carried by said actuators to form a plurality of control switches, said actuators each including detenting means for positively retaining the corresponding actuator in the actuated position thereof when that actuator is actuated and for positively retaining that actuator in the unactuated position thereof when that actuator is unactuated such that when an actuator is actuated that actuator will be retained in the actuated state thereof and the remaining actuators will be retained in the unactuated states thereof, said detenting means comprising a projection on each of said switch contacts carried by said actuators for engaging between the contacts of the corresponding set of contacts associated with said housing and means for biasing said actuator carried contacts into engagement between said sets of contacts, each said projection engaging between a first two contacts of the corresponding set of contacts associated with the housing in the actuated position thereof and engaging between a second two contacts of said corresponding set of contacts in the unactuated position thereof.

3. In a motor control system for small appliances or the like, a switching arrangement comprising: a housing; a plurality of longitudinally displaceable switch actuators, each of said actuators carrying a switch contact and including a pushbutton portion extending outwardly of said housing; means for providing a wedging action for preventing the remainder of said plurality of actuators from being actuated when one of said actuators is actuated in the absence of another of said actuators being positively actuated and for returning a previously actuated actuator to the unactuated position thereof upon actuation of a further actuator, said means including a plurality of laterally displaceable block members located within said housing, each of said actuators, when actuated, entering between one of said block members and a further surface or between two of said block members and the total spacing between said block members being such that only one said actuator can be actuated at a time; and a plurality of sets of contacts associated with said housing for individually cooperating with a corresponding contact carried by said actuators to form a plurality of control switches, said switching arrangement further comprising at least one contact carried by at least one of said block members, and at least one further contact associated with said housing for cooperating with said block member-carried contact to form a further switch.

4. In a motor control system as claimed in claim 3 wherein said block members include first and second beveled surfaces and said actuators include first and second beveled surfaces, the beveled level surfaces of said block members and said actuators cooperating to enable an actuator to enter between a pair of block members upon actuation thereof and to provide de-actuation of previously actuated actuator upon actuation of a further actuator.

5. In a motor control system as claimed in claim 4 wherein said housing includes means for preventing longitudinal movement of said block members while permitting lateral movement thereof and for limiting the longitudinal movement of said actuators.

6. In a motor control system as claimed in claim 3 wherein said housing includes a circuit board secured to an open end thereof on which said plurality of sets of contacts are mounted.

7. In a motor control system as claimed in claim 3 wherein said plurality of actuators comprises a first set of actuators located on one level within said housing and a second set of actuators located on a second level within said housing, a first set of said block members located on said first level cooperating with said first set of actuators, a second set of block members located on said second level cooperating with said second set of actuators and a further block member located between said first and second levels providing interaction between said first and second sets of block members.

8. In a motor control system as claimed in claim 3 wherein said motor control system includes a motor having a first and second stator windings, said switching arrangement selectively controlling the connection of said windings into circuit relationship with a source of electrical energy.

9. In a motor control system as claimed in claim 8 wherein said first winding includes first and second taps along the length thereof, said switching arrangement providing selective connection of portions of said tapped winding to said source.

10. In a motor control system as claimed in claim 8 further comprising a diode selectably connected into circuit relationship with said source in accordance with the setting of said further switch.

11. In a motor control system as claimed in claim 10 wherein said first winding includes first and second taps along the length thereof and said plurality of actuators comprising first, second, third, fourth, fifth, sixth, seventh and eighth actuators, said first actuator controlling disconnection of said motor from said source, said second actuator providing energization of said first and second windings by said source through said diode, said third actuator providing energization of said second winding and the portion of said first winding connected beyond said first tap through said diode, said fourth actuator providing energization of said second winding and the portion of said first winding connected beyond said second tap through said diode, said fifth actuator providing energization of said first and second windings from said source with said diode disconnected, said sixth actuator providing energization of said second winding and the portion of said first winding connected beyond said first tap with said diode disconnected, said seventh actuator providing energization of said second winding and the portion of said first winding connected beyond said second tap with said diode disconnected and said eighth actuator providing energization of said second winding with said diode disconnected, whereby seven distinct motor speeds are provided.

* * * * *